(12) United States Patent
Ishizaki et al.

(10) Patent No.: US 6,542,815 B1
(45) Date of Patent: Apr. 1, 2003

(54) ROUTE SETTING DEVICE AND NAVIGATION DEVICE

(75) Inventors: Takashi Ishizaki, Obu (JP); Masanori Omi, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/675,210

(22) Filed: Sep. 29, 2000

(30) Foreign Application Priority Data

Oct. 13, 1999 (JP) ............................................ 11-291244

(51) Int. Cl.[7] .............................................. G08G 1/123
(52) U.S. Cl. ..................... 701/209; 701/209; 701/210; 340/990; 340/995
(58) Field of Search ................................ 701/207, 208, 701/209, 210, 213; 340/990, 995, 988

(56) References Cited

U.S. PATENT DOCUMENTS

| 5,752,217 A | * | 5/1998 | Ishixaki et al. ............. 701/201 |
| 6,118,389 A | | 9/2000 | Kamada et al. ............. 340/995 |
| 6,175,805 B1 | * | 1/2001 | Abe ........................... 701/209 |

FOREIGN PATENT DOCUMENTS

| EP | 978 706 | 7/1999 |
| JP | A-62-88099 | 4/1987 |
| JP | A-5-323870 | 12/1993 |
| JP | A-6-66588 | 3/1994 |
| JP | A-6-288782 | 10/1994 |
| JP | A-6-307881 | 11/1994 |
| JP | 8-233589 | 9/1996 |

\* cited by examiner

*Primary Examiner*—William A. Cuchlinski, Jr.
*Assistant Examiner*—Marthe Y. Marc-Coleman
(74) *Attorney, Agent, or Firm*—Law Offices of David G. Posz

(57) ABSTRACT

The present invention provides a desirable route that avoids particular roads where a start point or the like has been set on a particular road type. In the present invention, route evaluation values of links A and B on a toll road are multiplied by, for example, 1.0 times. Therefore, the sum of route evaluation values of a route through links A→G→D→E→F becomes 5+2+5+20+15=47 and the sum of evaluation values of a route through links B→G→F becomes 20+2+15=37. Thus, a route passing link B having a small sum of evaluation value is set as a route to the destination.

15 Claims, 13 Drawing Sheets

— MULTIPLIED LINK
— NOT MULTIPLIED LINK

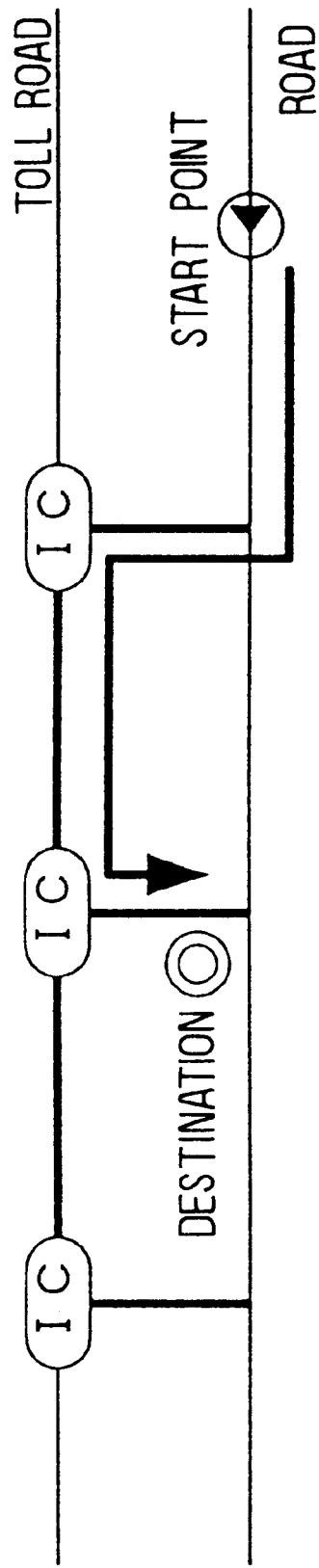

ROUTE SETTING DEVICE AND NAVIGATION DEVICE

CROSS-REFERENCE TO RELATED APPLICATION

The present invention is related to Japanese patent application No. Hei. 11-291,244, filed Oct. 13, 1999; the contents of which are incorporated herein by reference.

FIELD OF THE INVENTION

This invention relates to a route-setting device for setting a route to a destination, and more particularly to a route setting device that guides traveling along the set route.

BACKGROUND OF THE INVENTION

Conventional navigation systems can detect a present position by using GPS in the traveling vehicle. This system can display the present position on a display screen together with a road map, and guide the traveler along a suitable route set from the present position to the destination. This enables the user to smoothly drive to a desired destination. The route is set, generally, based upon the Dijakstra method or a similar method. Specifically, the route calculation cost (evaluation value of the route) is calculated from the present position to nodes by using map data stored in a static data source such as a CD-ROM or a DVD and by using link data for the links among the nodes. Links, having a minimum cost, are connected together to set a route to the destination after all costs up to the destination have been calculated.

Plural modes of operation can be used to set a route. These plural modes include a time-priority mode for setting a route that minimizes the traveling time, a distance-priority mode for setting a route that minimizes the traveling distance, and a common road-priority mode for setting a route that avoids toll roads as much as possible.

For the time-priority mode, the evaluation value of the road is the time needed for passing through the road as calculated based on expected average vehicle speeds, and a combination of roads is selected such that the sum of evaluation values for traveling from the start point to the destination becomes a minimum, thereby setting a route which minimizes the traveling time.

In the distance-priority mode, the evaluation value of the road is the length of the road, and a combination of roads are selected such that the sum of the evaluation values becomes a minimum, similar to the time-priority mode, thereby setting a route which minimizes the traveling distance.

In the common road-priority mode, the evaluation value for the toll road is adjusted larger (by, for example, 10 times) than the ordinary case based on, for example, the evaluation value of the time-priority mode. This relatively increases the sum of the evaluation values of when the user travels toll roads. Thus, the set route avoids toll roads as much as possible. The evaluation values that serve as a reference may be for the distance-priority mode or other criteria. Thus, the desired route is selected out of these modes. Namely, the route can be set to meet the user's demand, such as placing priority on the time, distance or common roads.

However, when the start point, passing point or destination is set on a toll road, requiring the user to use the toll road, then a very long roundabout route may be set depending upon road conditions if set in the common road-priority mode. This occurs because the evaluation value for the toll road is multiplied by ten folds. Accordingly, even a slight difference in the traveling distance of the toll road results in a great difference in the evaluation value. For example, avoiding a toll road as short as 300 meters may result in setting a route which goes through a common road as long as 3000 meters. Moreover, the user may find it strange when a route is set in a different direction from that contemplated by the user, in addition to traveling a long distance. For example, if a service area is set as the start point, the distance to an interchange located in the same direction as the destination is 10 Km and the distance to an interchange located opposite to the destination is 5 Km. Then, the difference is 5 Km, and a route is set over the common roads at a distance of 10 times 5 Km, i.e., to travel over a distance of 50 Km or less. This is undesirable since it goes toward the interchange opposite the destination, in addition to traveling about 50 Km of distance.

SUMMARY OF THE INVENTION

It is therefore an object of the present invention to set a desirable route and avoid particular roads where a start point, passing point or destination has been set on a particular road type.

In view of these and other objects, a route-setting device is provided for setting a route to a destination by calculating route evaluation values to the nodes based on the Dijakstra method, or other searching method that uses links connecting the nodes, and upon connection data among the links, and that connects links having a small total evaluation value from a start point to the destination. The device has a road-avoiding mode for setting a route to the destination, which avoids certain road types as much as possible. In one particular road-avoiding mode, the following route evaluation value is set. Here, the route evaluation value of the avoided road is set larger than the normal value. However, when the start point, the destination point or a passing point exists on the avoided road, the route evaluation value for that road (having a predetermined condition) is set to a relatively small value.

Here, the particular road is a particular road from the start point, destination or passing point on the particular road type to the nearest (next) outlet of the particular road. The particular road can be represented by a toll road or by an expressway in the toll road, a freeway, or a ferryboat route.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein

FIG. 9 is a view diagrammatically illustrating a difference in the judging conditions between S153 and S154 in FIG. 6 for a navigation device according to the present invention;

DETAILED DESCRIPTION OF THE INVENTION

Figure 1:
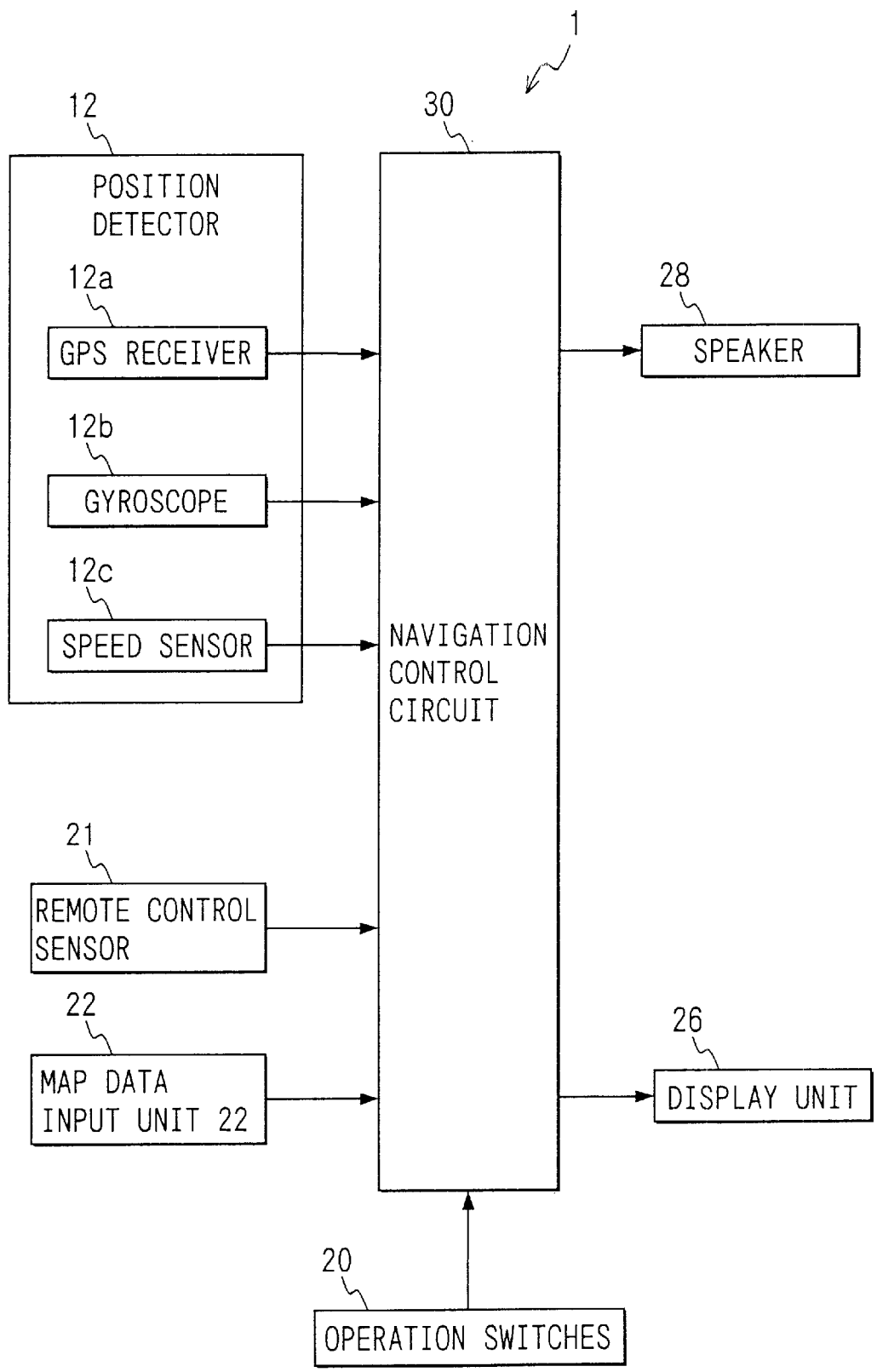
FIG. 1 is a block diagram illustrating the construction of a navigation device according to the present invention.

In FIG. 1, the navigation device 1 includes a position detector 12 for detecting the present position of the vehicle, operation switches 20 for inputting various instructions into the device, a remote control sensor 21 for inputting signals from a remote control terminal (not shown) but able to input instructions such as from remote switches 20, a map data input unit 22, a display unit 26 for displaying map and TV screens, speaker 28, and a navigation control circuit 30 which executes various processes in response to position detector 12, group of operation switches 20, map data input unit 22 and a remote control terminal (not shown) that controls the display unit 26 and the speaker 28.

The position detector 12 includes a GPS receiver 12a which receives, through a GPS antenna, electromagnetic waves transmitted from a satellite for GPS (global positioning system) to detect the position, azimuth, speed, etc. of the vehicle, a gyroscope 12b for detecting the magnitude of turning motion given to the vehicle, and a vehicle speed sensor 12c which is a vehicle speed sensor or a wheel sensor for detecting the distance which the vehicle has traveled. These sensors 12a to 12c have different errors and can be used to compensate each other. Depending upon the precision requirements, only some of the sensors 12a to 12c may be used. Or, there may employ a terrestrial magnetism sensor for detecting the absolute azimuth based on the terrestrial magnetism, or a sensor which finds the direction by accumulating the steering angles of the vehicle obtained from a difference in the revolution between the right and left wheels.

The group of operation switches 20 includes touch switches integral with the display device 26 and arranged on the display screen, and mechanical key switches provided around the display device 26. The touch switches include infrared-ray sensors arranged numerously in the transverse and longitudinal directions on the screen of the display device 26. When the infrared ray is shut off by a finger or a touch pen, the position where the ray is shut off is detected as a two-dimensional coordinate value (X, Y). Thus, when directly touching the display screen, a predetermined instruction is input.

The group of operation switches 20 operate the navigation device 1 and include switches for changing the content displayed on the display unit 26 and which sets a route to the destination. For route setting, three kinds of modes, i.e., time-priority mode, distance-priority mode and common-priority mode, can be changed to and set.

The map data input unit 22 inputs map-matching data for improving the precision of the position detector and various road data representing the connection of roads from the storage medium. As a storage medium, a CD-ROM or a DVD is generally used to store a large amount of data. However, any other medium such as memory card or the like may be used.

Here, the format of road data preferably includes link data, node data and interlink connection data. The link data includes link ID, which is a specific number for specifying the link, link class for identifying an express way, toll road, common road or annexed road, as well as data related to the link itself, such as "start point coordinate" of the link, "end point coordinate" of the link, and "link length" representing the length of the link. The node data includes "node ID," a number specific to the node connecting the links, inhibition of turn to the right or the left at an intersection, and data related to the presence of a signal. The interlink connection data includes data indicating whether a vehicle is allowed to go through or not, such as one-way, etc. Even the same link, one-way permits a vehicle to pass through from a certain link but inhibits the vehicle to pass through from another link. Therefore, whether the vehicle is allowed to pass through is determined depending upon how the links are connected.

The display unit 26 in this embodiment is a color display unit, and is capable of displaying, on the screen thereof, a mark indicating the present position of the vehicle detected by the position detector 12, road data input from the map data input unit 22, guide route displayed on the map, name, and additional data such as an indication in an overlapped manner. Further information can be displayed for guidance and calling out attention. The speaker 28 informs the user of voice data of various information processed by the navigation control circuit 30.

The navigation control circuit 30 includes a known microcomputer such as of CPU, ROM and RAM, and processing for displaying the present position of the vehicle based on the detection signals from the position detector 12 and a map near the present position read through the map data input unit 22. The circuit 30 includes processing for selecting the destination, i.e., for selecting a facility that serves as a destination according to the operation of the group of operation switches 20 or of the remote control terminal based on the facility index data stored in the map data input unit 22, and a so-called navigation processing, such as the processing for guiding the route by automatically selecting an optimum route from the present position to the destination to execute the guidance along the selected route. The method of automatically setting an optimum route can be represented by the Digiqystra method. A guidance route is displayed as overlapped on the road map on the display unit 26 to guide the driver along a suitable route.

The method, such as the Dijakstra method, is employed to calculate the route. The calculation of the route based on the Dijakstra method is a known method of calculating the route costs (evaluation values of the routes) from the present position up to the nodes by using link data for the links among the nodes and the connection data among the links inclusive of traffic regulations, and setting a recommended route by connecting the links that minimize the route cost after the cost calculations up to the destination have all been finished. The route cost of the links according to the Dijakstra method is calculated in compliance with, for example, the following formula:

Route cost=length of link×coefficient of width of the road×coefficient of the kind of the road    formula 1

Here, the coefficient of the width of the road is set depending upon the width of the road, and the coefficient road type is set depending upon the kind of road such as a toll road, etc. By adding up the route cost calculated according to the above formula, a route cost is found on the route to the destination. After the cost calculations up to the destination have all been finished, links that minimize the route cost are connected to set a recommended route to the destination.

In the navigation device 1 of the embodiment described above, the three modes can be changed over and set. I.e., the time-priority mode, distance-priority mode and common road-priority mode can be changed over and set in setting the route. These three modes will now be described.

Time-priority mode—sets a route that minimizes traveling time. The route cost is the time required for passing through the road as calculated based on an expected average vehicle speed for every road type, and a combination of the roads is selected that minimizes the sum of route costs of from the start point to the destination, thereby setting a route that minimizes traveling time.

Distance-priority mode—sets a route that minimizes traveling distance. The route cost is the length of the link, and a combination of the roads is selected that minimizes the sum of route costs similar to the time-priority mode, thereby setting a route that minimizes traveling distance.

The common road-priority mode—sets a route that avoids toll roads as much as possible. This is the toll road-avoiding mode. In this mode, the route cost of the toll road is multiplied by a predetermined mode coefficient K with, for example, the route cost of the time-priority mode as a reference. This mode coefficient K is, for example, 10. This adjustment increases the route cost sum when the user has traveled toll roads. Thus, a route is set that avoids toll roads as much as possible. The route cost that serves as a reference may be a route cost in the distance-priority mode or may be an evaluation value based on any other reference.

In the road-priority mode, however, if the route cost of the toll road is multiplied by 10 times in any situation, there are disadvantages as described in the following concrete examples 1 to 3.

Figure 2:
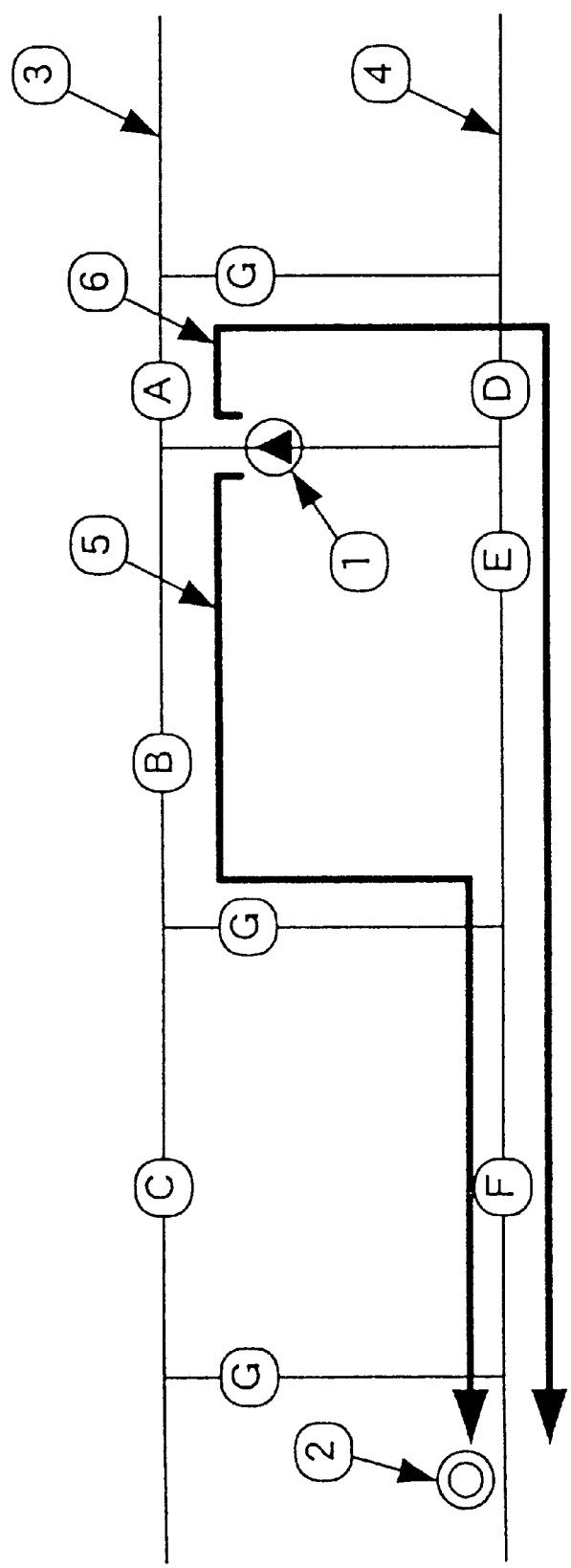
FIG. 2 is a view diagrammatically illustrating a difference in route setting for a navigation device according to the present invention.

In FIG. 2, reference numeral 1 denotes the present position, 2 denotes the destination, 3 denotes a toll road, and 4 denotes a common road. Reference numeral 5 denotes an ideal common road-priority route set by applying the invention, and 6 denotes a common road-priority route according to a prior art. Symbols A to G denote links, wherein A, B and C are links on the toll road 3. Therefore, the road type is a toll road. Symbols D, E and F are links on the common road 4. Therefore, the road type is a common road. Symbol G denotes roads annexed to the toll road 3.

The route evaluation values of the links represent the link lengths (length of the road). For the common road-priority mode according to the prior art, the route evaluation values of the toll road are all multiplied by 10. Therefore, the links A to C having link lengths of 5, 20 and 15 are all multiplied by 10 times yielding route evaluation values of 50, 200 and 150. The annexed road G is comprehended to be part of the toll road, and the route evaluation value thereof is the link length 2 multiplied by 10 times, i.e., 20. The links D to F pertaining to the common road 4 have link lengths of 5, 20 and 15, and their route evaluation values are simply 5, 20 and 15.

The situation shown in FIG. 2 has present position 1 on the annexed road G and is headed to the toll road 3. The annexed road is a one-way road. To go to the destination 2 on the common road 4, therefore, the user must travel either through link A or link B on toll road 3. In the common road-priority mode according to the prior art, the route evaluation values of the links are as described above, and have the sum through link A of 110. I.e., the sum of the route evaluation values of the route through A→G→D→E→F is 110. Alternatively, the sum of the route evaluation values of the route passing through link B, i.e., the sum of the route evaluation values of the route passing through B→G→F is 235. Therefore, the route heading opposite destination 2 has a smaller evaluation value and is, hence, set as the route to the destination.

In either case the toll road 3 must be used, but the route is set heading opposite to the destination 2, which is undesirable by the user. Also, this route is long. In the example shown in FIG. 2, it m ay appear that the roudabout route is long. However, the total evaluation value of the route through B→G→F→ is 235. Therefore, the route passing through A→G→D→E→F which is currently evaluated 110 is still smaller than the route evaluation value (of the route through B→G→F) despite its further travel through a common road having a link length of smaller than 125. It is therefore probable that a long roundabout route will be set.

According to the present invention, on the other hand, the present position exists on the annexed road which is part of the toll road. In this case, therefore, the route evaluation values for the links A and B on the toll road are not multiplied by 10, but instead are multiplied by, for example, 1.0. The link C on the same toll road does not fall under the predetermined conditions, and is multiplied by 10 times as a rule. Therefore, the sum of the route evaluation values of the route passing through link A, i.e., of the route passing through A→G→D→E→F becomes 5+2+5+20+15 =47, and the sum of the route evaluation values of the route passing through link B, i.e., of the route passing through B→G→F becomes 20+2+15=37. Thus, the route passing through the link B having a small total evaluation value is set as a route to the destination.

Figure 3:
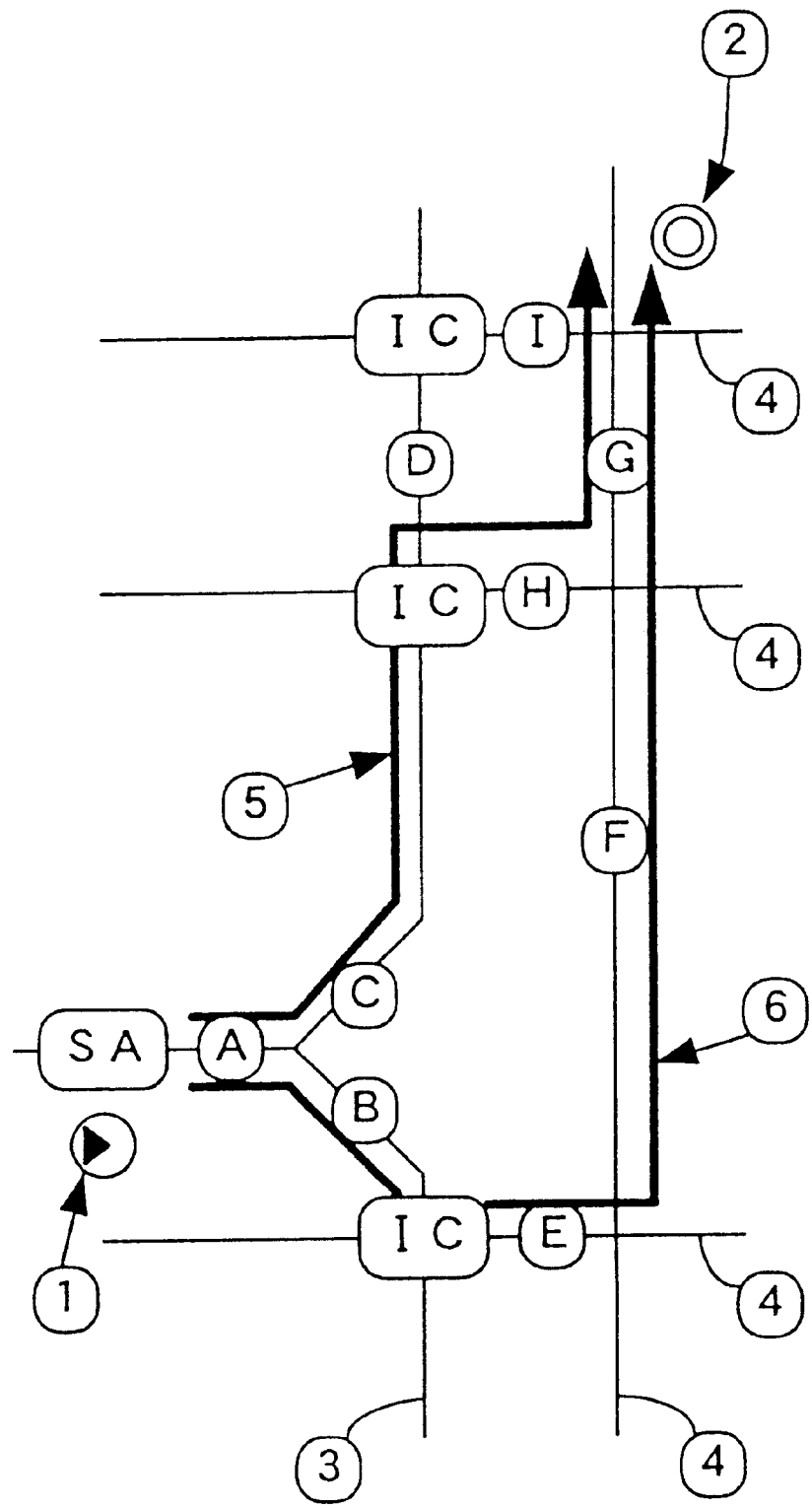
FIG. 3 is a view diagrammatically illustrating a difference in route setting for a navigation device according to the present invention.

FIG. 3 illustrates where the route is set from a service area SA in the common road-priority mode, wherein the numerals (1 to 6) have the same meanings as those of the Example 1 described above with reference to FIG. 2. Symbols (A to I) denote the links, wherein A to D are the links on toll road 3, and E to I are the links on common road 4. For toll road 3 in Example 1, the link length which is an ordinary route evaluation value is multiplied by 10. Therefore, the links A to D having link lengths of 5, 10, 15 and 10 are multiplied by 10 times, respectively, resulting in route evaluation values of 50, 100, 150 and 100. The links E to I pertaining to the common road 4 have link lengths of 5, 20, 15, 5 and 5, and their route evaluation values simply remain at 5, 20, 15, 5 and 5.

In FIG. 3, the present position 1 is in service area SA. Thus, the user must travel using either link A or link B on toll road 3 to get to common road 4 from interchange IC. Here, for the common road-priority mode based on the prior art, the route evaluation values for the links are as described above, and the sum of the route evaluation values of the route passing through the link B becomes 190. I.e., the sum of the route evaluation values of the route passing through A→B→E→F→G becomes 190. Alternatively, the sum of the route evaluation values of the route passing through the link C is 215, i.e., the sum of the route evaluation values of the route through A→C→H→G is 215. Therefore, the route heading to the interchange IC located on the side opposite to the destination 2 has a smaller evaluation value and is, hence, set as the route to the destination. The user who drives toward the interchange IC located on the side opposite to the destination 2 may think it is strange.

When the present invention is used, however, the route evaluation values for the links A, B and C on the toll road are not multiplied by 10, but are multiplied by, for example, 1.0. The link D on the toll road does not fall under the predetermined condition, and its route evaluation value is multiplied by 10 as a rule. Therefore, the sum of the route evaluation values of the route passing through the link B, i.e., the sum of the route evaluation values of the route passing through A→B→E→F→G becomes 5+10+5+25+10=55. Whereas the sum of the route evaluation values of the route passing through the link C, i.e., the sum of the route evaluation values of the route passing through A→C→H→G becomes 5+15+5+10=35. Therefore, the route passing through the link C, having a small sum evaluation value, i.e., a route heading to the interchange closer to the destination, is set as a route to the destination.

Figure 4:
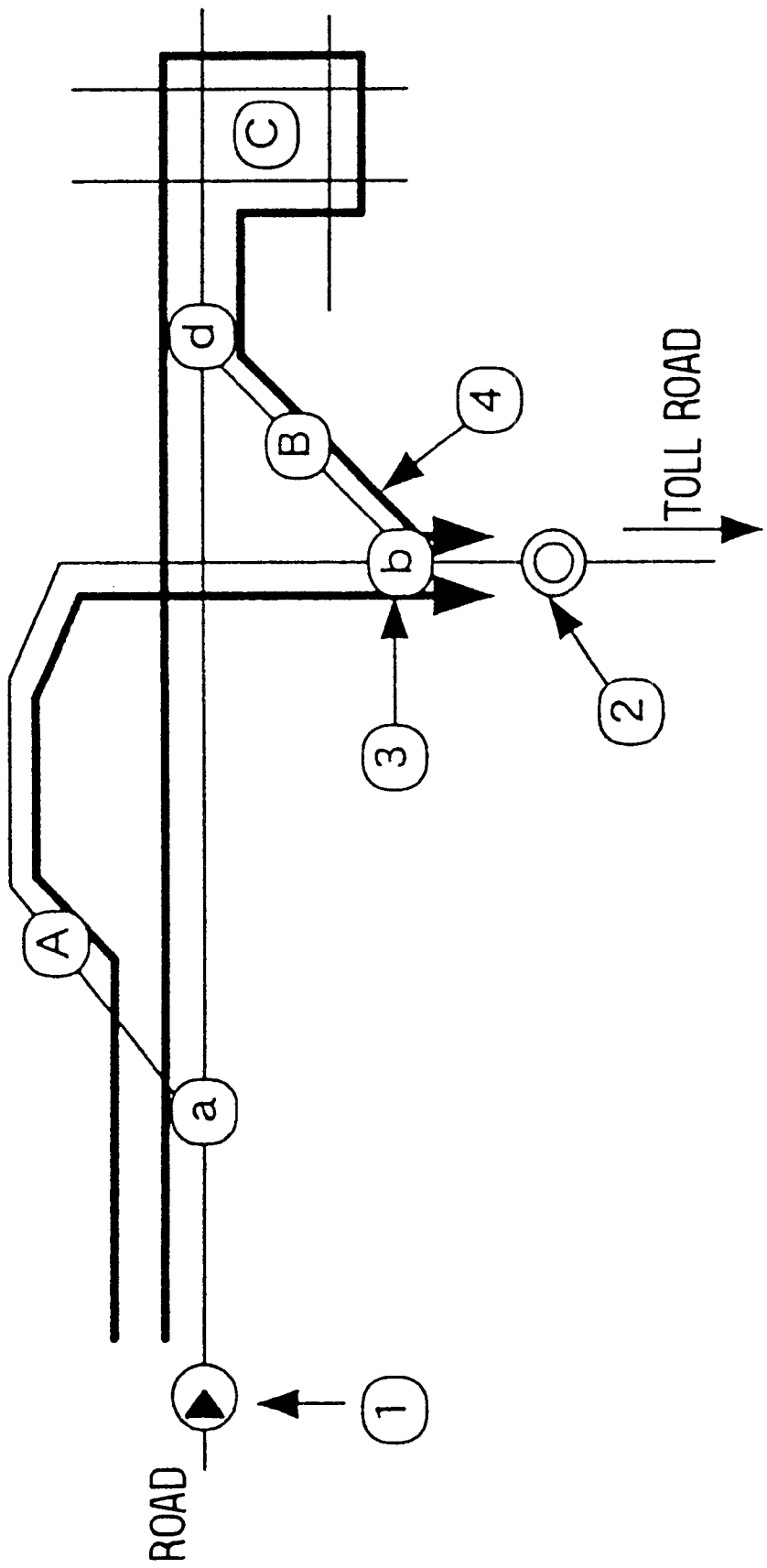
FIG. 4 is a view diagrammatically illustrating a difference in route setting for a navigation device according to the present invention.

FIG. 4 illustrates a route set in the common road-priority mode when the user proceeds to the main track of the toll road from the common road through the annexed road. Here, reference numeral 1 denotes the present position, 2 denotes the destination, 3 denotes an ideal common road-priority route set according to this invention, and 4 denotes a common road-priority route according to the prior art.

Symbols A to C denote links and a, b and d denote nodes, wherein A and B are annexed roads which are treated in the same manner as the toll road concerning the route evaluation values. Symbol C is a link on the common road.

For the route to the destination 2 passing through the link A, i.e., for the route from a to b through the link A, the user must travel the annexed road (link A) 1 km. For the route to destination 2 through the link B, i.e., passing through a→d→c→d and arriving at b passing through the link B, the user needs to travel the annexed road (link B) 500 meters. In this case, the difference in the distance traveled through the annexed road is 500 meters and the route evaluation value is multiplied by 10. Therefore, if the difference is not larger than 5 km, the route a→d→C→d→B→b, even if it goes through a roundabout path, has a route evaluation value sum that is smaller than the route a→A→b. Therefore, it is set as the route to the destination. When viewed from the present position 1, the link A (which is the annexed road) is located closer thereto, and the user may think that the route should pass through the link A. In fact, however, the route is set traveling through the remote annexed road, seeming strange to the user. When the present invention is used, alternatively, the route evaluation values of the links A and B (which are the annexed roads) are not multiplied by 10, and a shorter route is selected. Therefore, the path running through link A, which is closer to the present position, is set as the route to the destination. Accordingly, therefore, the route cost that is set greater than the ordinary value, is set relatively small under predetermined conditions (e.g., start point, destination or passing point on a toll road), to set a more suitable route to the destination that is desirable to the user.

Figure 5:
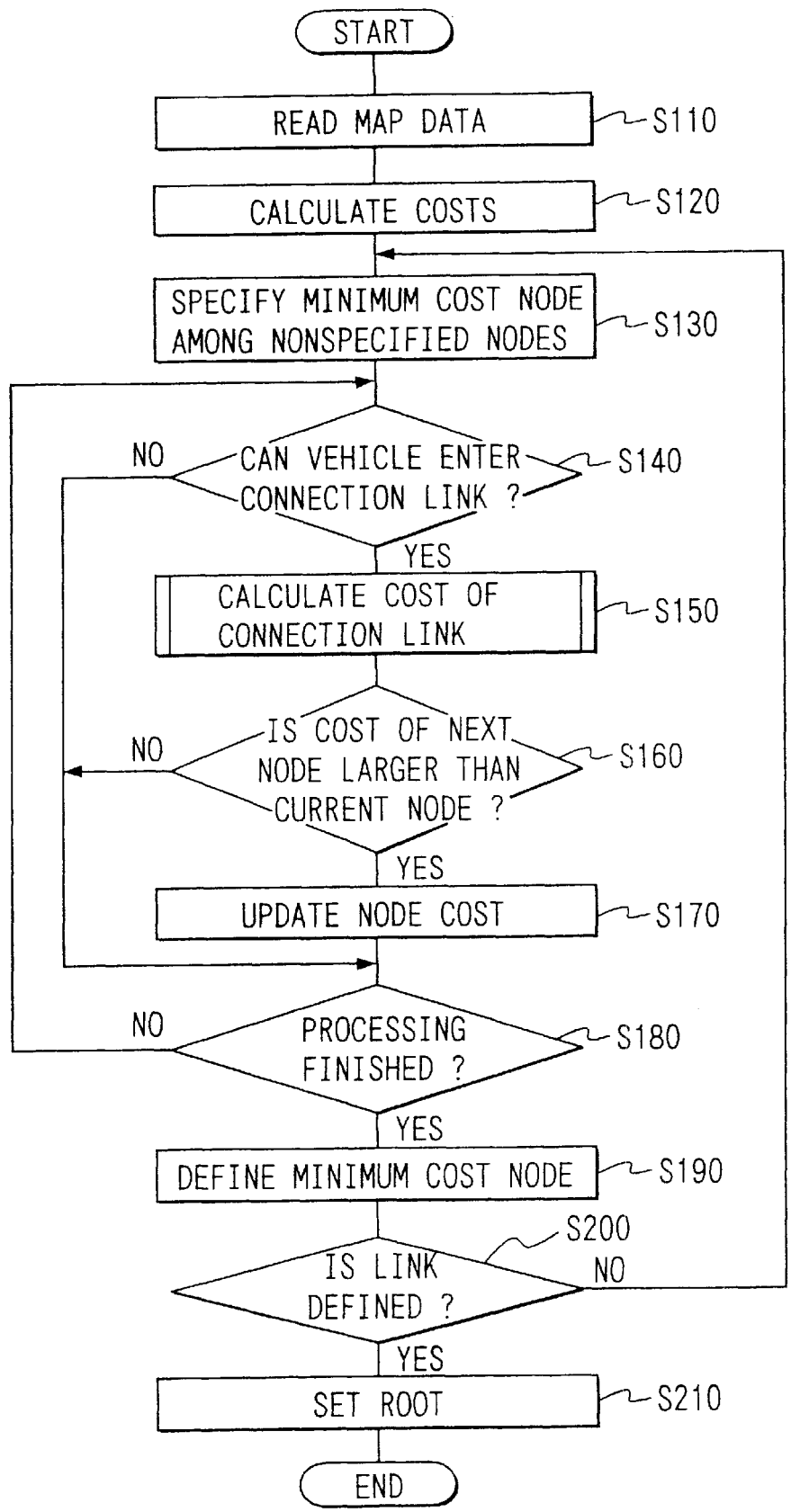
FIG. 5 is a flowchart illustrating a processing for setting a route to a destination for a navigation device according to the present invention.

With these points, described below with reference to the flowcharts of FIGS. 5 and 6, processing for setting a route to a destination executed by the navigation control circuit 30 is described. Here, processing for reading the map data is executed at first step S110 in FIG. 5. This processing is based on a prerequisite that the destination has been set. When the destination is a link, this link is treated as a final link. When the destination is not on any of the links, a link closest to the destination is treated as the final link. In reading the map data at step S110, the map data of a predetermined region inclusive of the destination and the present position, are read from a storage medium such as CD-ROM via the map data input unit 22. To set a route to the destination based upon read map data, costs are first calculated for the nodes at both ends of a start link based upon the present position (start point) of the vehicle (S120). In this case, a position is set on a link (start link) closest to the present position of the vehicle, the cost for the link is calculated in compliance with the formula 1 (route cost=link length×coefficient of the width of the road×coefficient of the kind of the road×degree of jamming) described above. The initial cost is calculated by the proportional distribution from the positional relationship to the nodes at both ends of the link.

Next, a node having a minimum cost is specified among the nodes that have not been defined yet (S130). Next, a connection link connected to the specified node is specified by using interlink connection data among the road data, and the processing of S140 to S170 are executed for every connection link that is specified.

It is then determined whether the vehicle can enter into the connection link (S140). When the vehicle is allowed to enter into the connection link (S140, YES), the cost of the connection link is calculated (S150). Details of the processing for calculating the cost at S150 will be described later with reference to FIG. 6. Here, the description of FIG. 5 continues.

When the calculation of cost ends at S150, it is determined at S160 whether the cost of the next node is larger than the cost calculated this time. That is, it is determined whether the cost of route calculated this time for the node of the connection link is smaller than the preceding cost. When the cost of the next node is larger than the cost calculated this time (S160, YES), the cost of the next node is updated (S170) and the routine proceeds to S180. When the cost of the next node is smaller than the cost calculated this time (S160, NO), the routine proceeds to S180 without executing the processing at S170.

At S180, it is determined whether the processing of S140 to S170 for all connection links have finished. When the processing has not finished (S180, NO), the routine returns to S140 where the processing is executed for the next connection link. When the processing is finished for all connection links (Sl80, YES), the routine proceeds to S190 where a node having a minimum cost is defined. Next, it is determined whether the nodes are defined up to a node at the end link (S200). When the nodes have not been defined yet (S200, NO), the routine returns to S130. As will be obvious from the foregoing description, the nodes having minimum cost are successively specified among the undefined nodes.

The cost of the link at the node is calculated and processing is executed for updating the cost of the node of the connection link connected to the end node of the link. When the cost of the end link is defined (S200, YES), a route is formed (S210). At S210, the route is formed by tracing the minimum cost route from the destination toward the start point (present position), reversing the route, and specifying the route from the start point (present position) to the destination as a train of links. The route to the destination specified by the train of links is displayed in an emphasized manner such as changing color on a map displayed on the display unit 26.

The foregoing description has dealt with the whole processing for setting the route. Next, described below in detail with reference to FIG. 6 is the processing for calculating the cost at S150. At first step S151 in FIG. 6, it is determined whether the present setting mode is the common road-priority mode. When in the time-priority mode or the distance-priority mode (S151, NO), not the common road-priority mode, the cost is calculated according to that mode (S155) to end the routine. When it is the common road-priority mode (S151, YES), however, it is determined whether the link is a toll road relying upon the link in the road data.

When it is not a toll road (S152, NO), the routine proceeds to S155, and the cost is calculated according to the time or distance mode. Even when it is the common road-priority mode, links which are not toll roads are calculated for their costs like in other modes.

When the link is a toll road (S152, YES), the routine proceeds to S153 where it is determined whether the link is from the starting point of the calculation to the next interchange (hereinafter abbreviated as IC). When the link goes to the next IC (S153, YES), the routine proceeds to S156, and the cost is calculated at a magnification lower than that usually executed in the common road-priority mode. That is, the route cost of the toll road is basically equal to the route cost of in the time-priority mode, which is multiplied by a predetermined mode coefficient K of preferably 10. At S156, however, the mode coefficient K is set smaller than 10. Here, the mode coefficient is 1.

When the link does not go to the next IC (S153, NO), the routine proceeds to S154 where it is judged whether the link is from the ending point of the calculation to the next IC. When the link does not go to the next IC (S154, NO), the routine proceeds to S155 where the cost is calculated in this mode. When the link goes to the next IC (S154, YES), the routine proceeds to S156 where the cost is calculated at decreased magnification.

Figure 6:
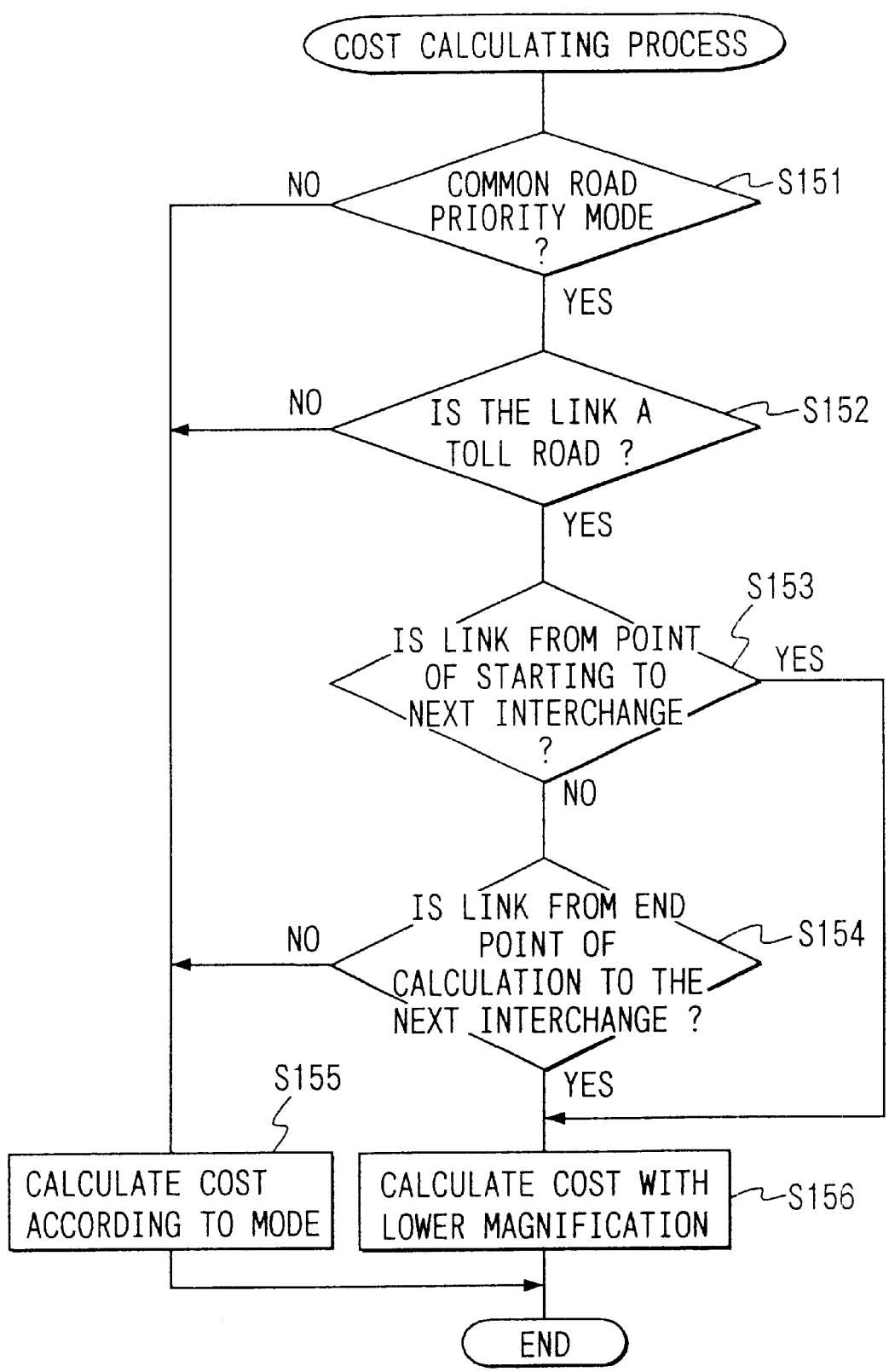
FIG. 6 is a flowchart illustrating a process for calculating the connection cost links executed at S150 of FIG. 5 for a navigation device according to the present invention.

In the processing in FIG. 6, when the connection link is a toll road (S152, YES), it is determined whether the link is from the starting point of the calculation to the next IC (S153, YES). When the link is from the end point of the calculation to the next IC (Sl54, YES), the cost is calculated at decreased magnification (S156). Therefore, the starting point and the end point of the calculation will be described and, then, determination at S153 and S154 will be described in detail.

The starting and ending points of calculation are now described. When setting the route, when a passing point has been set, the route is calculated being sectionalized for every passing point. The point on the side of the present point in each section is treated as a starting point for the calculation. The point on the side of the destination is treated as an ending point for the calculation. In calculating, for example, start point→route A→passing point→route B→destination, the starting point of the calculation in the calculation of the route A is the start point, and the ending point of the calculation is a passing point. The starting point of the calculation in the calculation of the route B is a passing point, and the ending point of the calculation is the destination.

At S153, it is determined whether the link is from the starting point of the calculation to the next IC. Here, all paths satisfying the following conditions are calculated, and the judgement is rendered to be YES when the link is included in the path.

Condition 1—1: Obey the rules of traffic.

Condition 1–2: Exclude the common roads.

Condition 1–3: At an intersection (outlet of toll road) where the main track of the toll road connects to other roads (inclusive of annexed road), the vehicle shall not travel "toll main track"→"toll main track".

Condition 1–4: When the "main track of toll road" is included in the path, the vehicle shall not travel "toll annexed road"→"toll main track".

Figure 7:
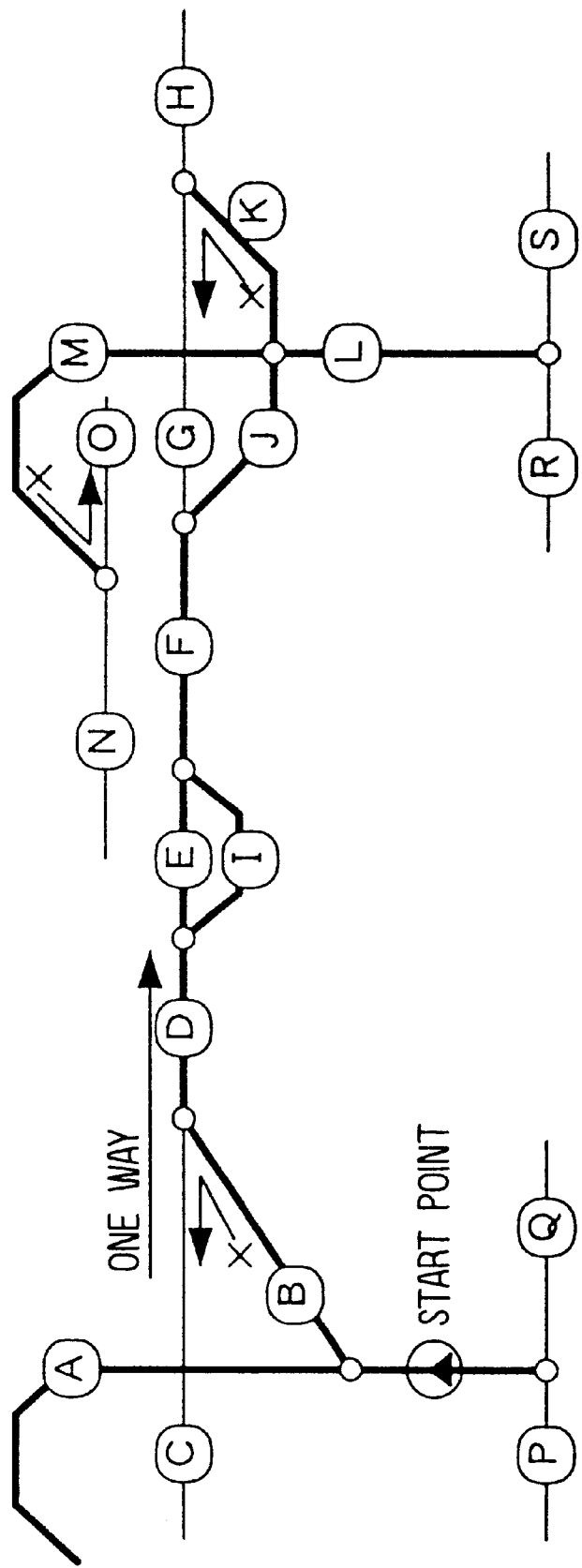
FIG. 7 is a view diagrammatically illustrating the meanings of judging conditions at S153 in FIG. 6 for a navigation device according to the present invention.

The meanings of these conditions will now be described with reference to FIG. 7. As for symbols (A to S) shown in FIG. 7, symbols C, D, E, F, G, H, N and O represent toll main tracks, and symbols A, B, J, K, L and M represent toll annexed roads. Further, symbol I represents a service area (SA) road or a parking area (PA), and symbols P, Q, R and S represent common roads. When the present position exists at a place shown in FIG. 7, the following determinations are rendered concerning the links. Link C cannot be arrived at from the present position unless the user drives backward on the one-way road, and is excluded under the above-mentioned condition 1—1. The link G is excluded under condition 1–3. This is because at the intersection where the links F and G, toll main tracks, are connected to link J (the annexed road), the vehicle is not allowed to enter into the toll main track G from the toll main track F.

The links H and N are excluded under the condition 1–4. This is because the vehicle is not allowed to enter the links H, N (toll main tracks) from link K (a toll annexed road) since links D and F (toll main tracks) are included in the path.

The link D is a toll main track where the user will travel from the link B (the toll annexed road). No toll main track is included in the path leading to link D. Therefore, this link may be traveled and is not excluded.

The links P to S are common roads and are excluded under the condition 1–2.

Upon determining the conditions as described above, the links C, G, H and N among the links corresponding to the toll roads, toll annexed roads and related SA/PA roads and are excluded under the above conditions, are multiplied by a predetermined number, i.e., by 10 at S155 in FIG. 6 to calculate their costs. Other links A, B, D, E, F, I, J, K, L and M are multiplied by a decreased number at S156 in FIG. 6 to calculate their costs. Processing at S154 is now described. At S154, it is determined whether the link is from the ending point of the calculation to the next IC. Here, all paths satisfying the following conditions are calculated and the determination is YES when the link is included in the path.

Condition 2–1: Obey traffic rules.

Condition 2—2: Exclude common roads.

Condition 2–3: At an intersection (toll road outlet) where the main track of the toll road connects to other roads (inclusive of annexed road), the vehicle shall not travel "toll main track"→"toll main track".

Condition 2–4: The vehicle shall not travel "toll main track"→"toll annexed road".

Figures 8A, 8B:
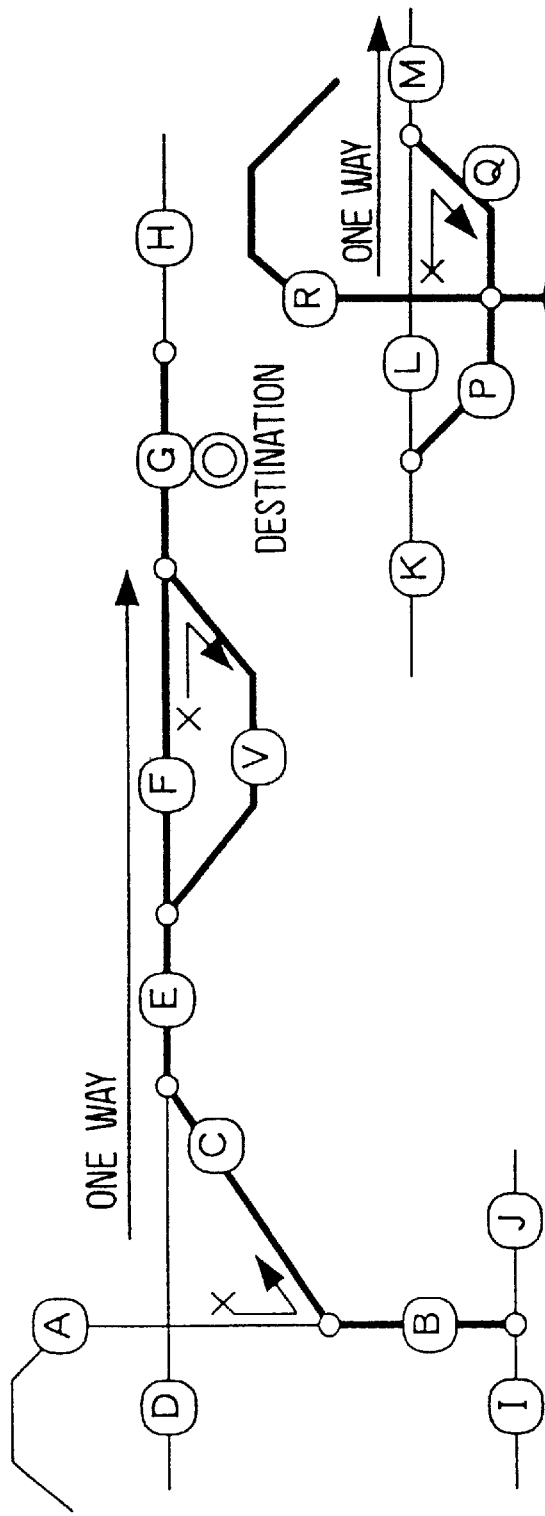
FIG. 8A is a view diagrammatically illustrating the meanings of judging conditions at S154 in FIG. 6 for a navigation device according to the present invention.
FIG. 8B is a view diagrammatically illustrating the meanings of judging conditions at S154 in FIG. 6 for a navigation device according to the present invention

The meanings of these conditions will now be described with reference to FIG. 8. FIG. 8 illustrates two road conditions (a) and (b) having destinations. As for the symbols (A to U) in FIGS. 8(a) and 8(b), symbols D, E, F, G, K, L and M represent toll main tracks, and symbols A, B, C, P, Q, R and S represent toll annexed roads. Further, symbol V represents a road for SA or PA, and symbols I, J, T and U represent common roads.

When the destinations exist at positions shown in FIGS. 8(a) and 8(b), the following determinations are rendered concerning the links.

The links A, L and M are excluded under the condition 2–1. That is, the link A is excluded by traffic regulations for the links A→C, and the link L is excluded by traffic regulations for the links L→Q. Further, the link M, a one-way road, is excluded.

The link D is excluded under condition 2–3. This is because at an intersection where links D and E (toll main tracks) are connected to link C (the annexed road), the vehicle is not allowed to enter into the toll main track E from the toll main track D. The link H is a one-way road and is excluded under condition 2–1. The links I, J, T and U are common roads and are excluded under the condition 2—2. Link K is excluded under condition 2–4. This is because, the vehicle is not allowed to enter into the link P (the toll annexed road) from the link K (the toll main track).

In FIG. 8A, upon determining the conditions as described above, the links A, D and H among the links corresponding to the toll roads and are excluded under the above conditions, are multiplied by a predetermined number, i.e., by 10 at S155 in FIG. 6 to calculate their costs. Other links B, C, E, F, G and V are multiplied by a decreased number at S156 in FIG. 6 to calculate their costs.

In FIG. 8(b), on the other hand, among the links corresponding to toll roads, those links K, L and M excluded under the above conditions are multiplied by a predetermined number, i.e., multiplied by 10 at S155 in FIG. 6 to calculate their costs. Other links P, Q, R and S are multiplied at a small number at S156 in FIG. 6 to calculate their costs.

The difference between S153 and S154 is now described. The determining conditions at S153 and S154 are different only in their conditions 1–4 and 2–4. It is now presumed that the conditions at S154 are the same as those at S153. Then, when a present position exists on a common road and the entrance to a toll road is a destination, and when the route is calculated in the common road-priority mode, then, the range which is not multiplied becomes as represented by thick lines in FIG. 9. Where the toll road is not multiplied, in general, the route cost of the toll road is smaller than the route cost of the common road. In the situation shown in FIG. 9, therefore, the route the user uses to enter the toll road through the IC closer to the start point and exiting the toll road through the outlet where the destination is set, has the smallest route cost sum, and is set as a route to the destination In this embodiment, however, when the ending point of the calculation is set on the annexed road, the range not multiplied is confined within the set IC so that the above-mentioned situation will not occur. For this purpose, the condition 2–4 is differed from the condition 1–4. Therefore, if there is no issue with these points, both S153 and S154 may be determined under the same conditions.

In the navigation device 1 of this embodiment as described above, when setting the route to the destination based on the Dijiqystra method or other method, the route cost, such as for a toll road, is basically multiplied by 10 times for the common road-priority mode. Under a predetermined situation (e.g., when any one of the start point, destination or passing point is on the toll road), the route cost set larger than a normal case, is set relatively smaller than normal.

Though this embodiment has dealt with the case of setting a route that avoids toll roads as much as possible as the common road-priority mode, the embodiment can be further generalized and realized as a particular road-avoiding mode to avoid a particular road type as much as possible. In this case, the particular road type may be limited to expressways in the toll road or may be freeways such as those in the United States. There can be further included a route that uses a ferryboat. Not being limited to these embodiments only, any reason may be taken into consideration for avoiding the roads of particular kinds.

A point in the first embodiment is to lower the route cost from a starting point of (ending) the calculation to the next IC as represented at S153 to S156 in FIG. 6. Therefore, the processing corresponding to S153, S154 of FIG. 6 is executed as a pre-processing in really calculating the cost, the links that satisfy the conditions are detected, and the result is referred to during the real calculation to carry out the processing at high speed.

Figure 10:
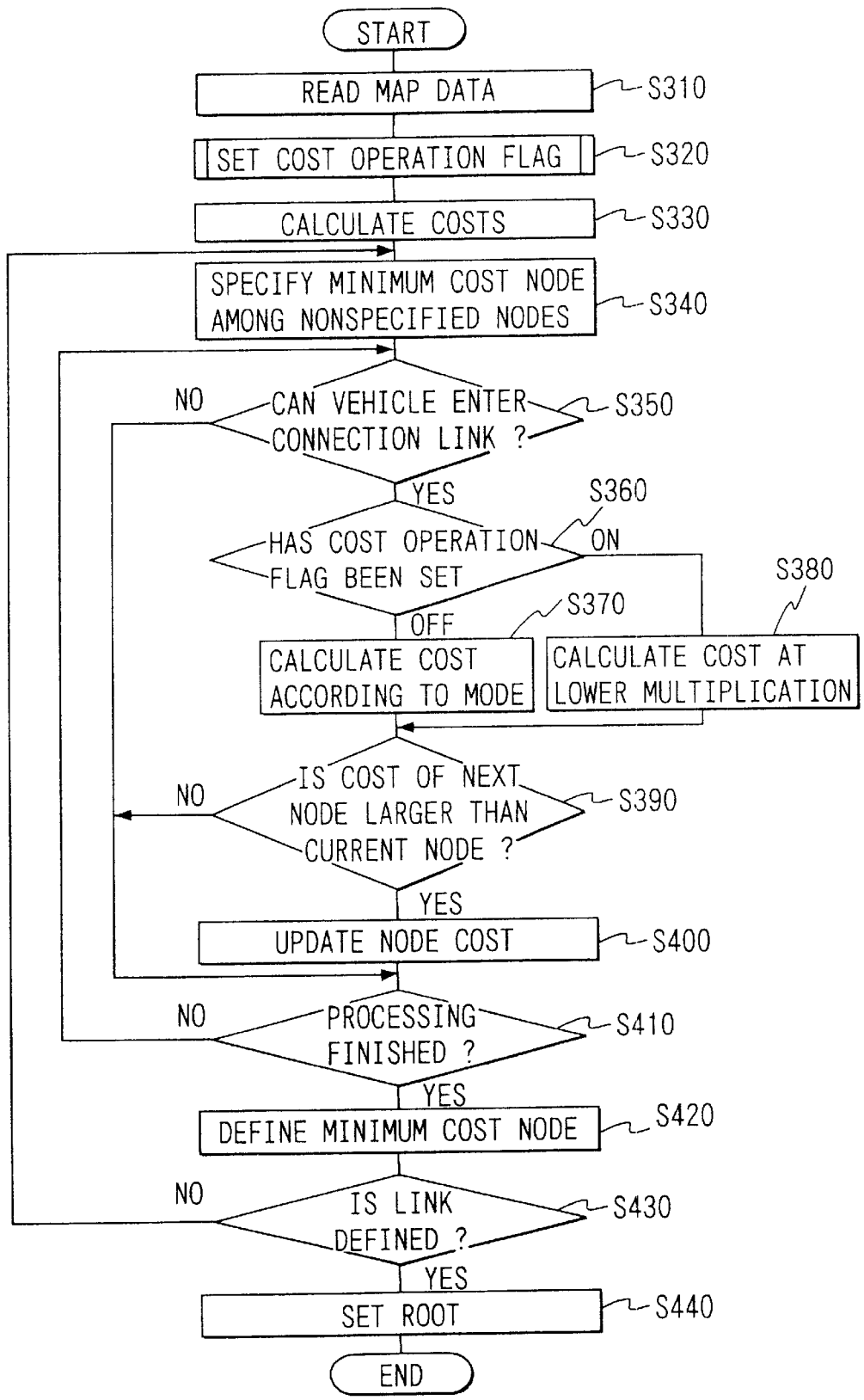
FIG. 10 is a flowchart illustrating a processing for setting a route to a destination for a navigation device according to the present invention.
Figure 11:
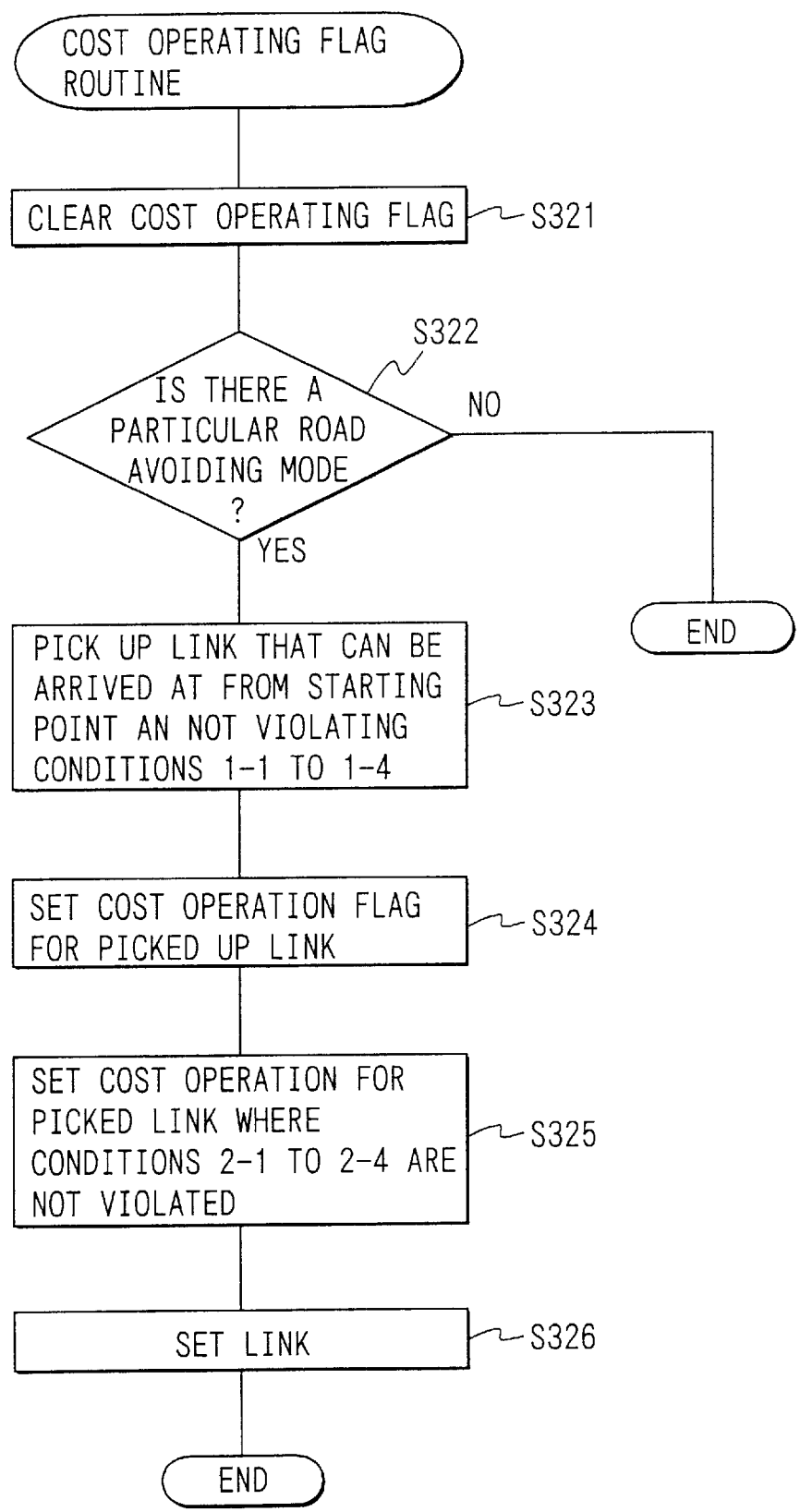
FIG. 11 s a flowchart illustrating a processing for setting a cost operation flag executed at S320 in FIG. 10 for a navigation device according to the present invention.

In this case, the processing may be executed as shown in flowcharts of FIGS. 10 and 11. FIGS. 10 and 11 will now be described. A first step S310 in FIG. 10 reads the map data the same as S110 of FIG. 5, and next S320 is a processing that does not exist in FIG. 5 and that sets a cost operation flag. In FIG. 11, the cost operating flag is described. After the cost operation flag is cleared (S321), it is determined whether a particular road-avoiding mode (S322) is being used. Here, the words "particular road-avoiding mode" are used as a generic concept of the above-mentioned common road-priority mode. If not, (S322, NO), the processing routine ends, and proceeds to S330 in FIG. 10. If yes (S322, YES), links are picked that can be arrived at from the starting point where the calculation violates none of the conditions 1–1 to 1–4, and a cost operation flag corresponding to the link that is picked up is set (flag =ON)(S324). At the following S325, a link is picked up that arrives at the end point, where the calculation violates no conditions 2–1 to 2–4, and a cost operation flag corresponding to the link that is picked up is set at S326.

After the processing for setting the cost operation flag is executed, the routine proceeds to S330 in FIG. 10. S330 to S350 in FIG. 10 are the same as S120 to S140 in FIG. 5, and are not described here. When the vehicle is allowed to enter into the connection link at S350, it is determined at S360 whether the cost operation flag has been set. When the cost operation flag has not been set (flag=OFF), the routine proceeds to S370 where the cost is calculated according to the mode. When the cost operation flag has been set (flag=ON), the routine proceeds to S380 where the cost is calculated by lowering the multiplication to be smaller than that of ordinary case. These processings S370 and S380 are the same as the processings S155 and S156 of FIG. 6. The subsequent processings S390 to S440 are the same as those of S160 to S210 of FIG. 5, and are not described.

Second embodiment. According to the first embodiment as described above, the route cost is decreased smaller than the normal state from starting (ending) the calculation to the next IC to solve the problem. According to the second embodiment, however, a road other than the particular road (avoided road) is used as a starting point (ending) for calculating the cost. The content will now be briefly described. First, paths satisfying the above conditions 1—1 to 1–4 are all searched, and the end points of the paths are used as points of starting the calculation. Similarly, paths satisfying the conditions 2–1 to 2–4 are all searched, and the path end points are used as ending points for the calculation. Thus, when the starting point (ending) of the calculation is on a particular road, the outlet of the neighboring IC is detected, and the detected point is used as a temporary starting of (ending) the calculation. Upon conducting the calculation from the starting point of (ending) the calculation, it is allowed to obtain a route to the nearest IC from the starting point of (ending) the calculation. In calculating the route, the starting point of (ending) the calculation is on a road other than the particular road. Therefore, there is no problem such as that described with reference to FIGS. 2 to 4.

From the true starting point of the calculation to the temporary starting point of the calculation (IC nearest to the start point), and from the temporary ending point of the calculation (IC nearest to the end point) to the true ending point of the calculation, can be interpolated by forming a train of links based on the path of when the temporary starting point of (ending) the calculation is obtained and by coupling them together.

Figure 12:
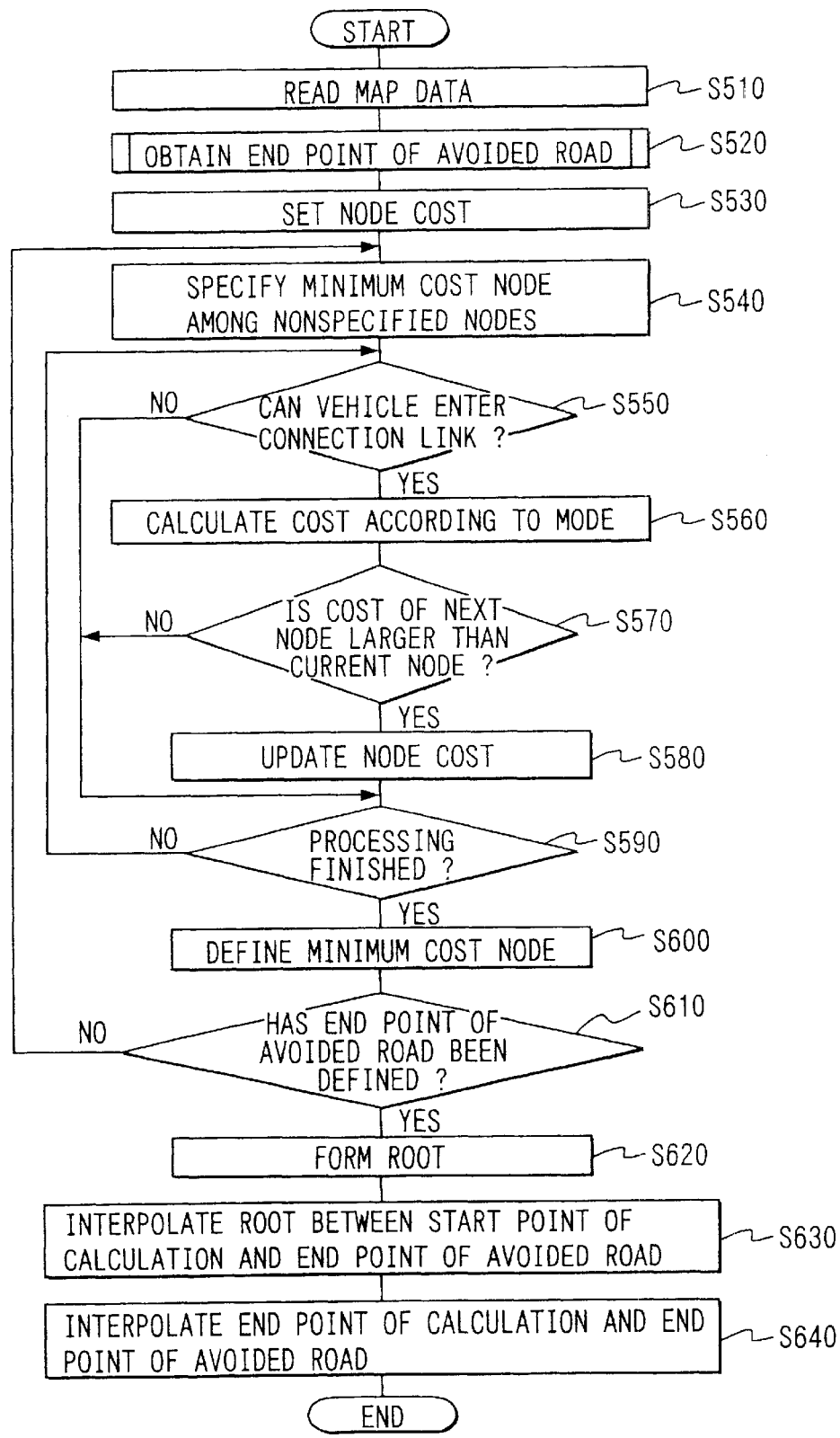
FIG. 12 is a flowchart illustrating the processing for setting a route to a destination according to a second embodiment of a navigation device according to the present invention.
Figure 13:
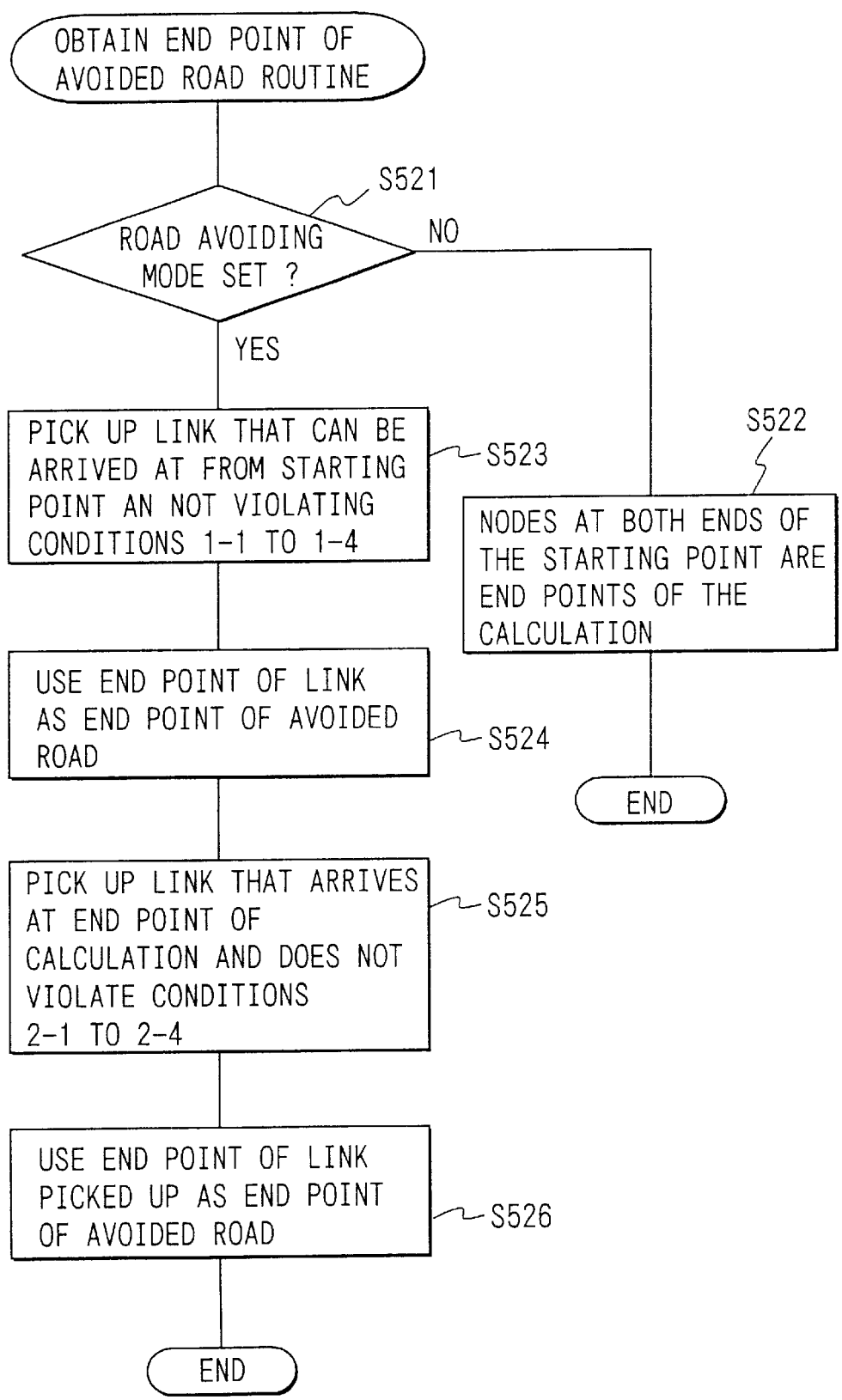
FIG. 13 is a flowchart illustrating processing for obtaining an end point of an avoided road, executed at S520 in FIG. 12, for a navigation device according to the present invention.

Referring to FIGS. 12 and 13, a second embodiment of the invention is described. A first step S510 in FIG. 12 reads the map data the same as S110 of FIG. 5. Next at S520, an end point of the avoided road is obtained. The processing for obtaining the end point of the avoided road will now be described with reference to FIG. 13. It is first determined whether the particular road-avoiding mode (S521) is being used. When not, (S521, NO), the processing routine ends with nodes at both ends of the starting point of (ending) the calculation as the end points of the avoided road (S522), and the routine proceeds to S530 in FIG. 12. When in the particular road-avoiding mode (S521, YES), on the other hand, a link that can be arrived at from the starting point of the calculation and not violating conditions 1—1 to 1–4 is picked up (S523). As such, the end point of the link that is picked up is used as an end point of the avoided road on the side of the start point (S524). At subsequent step S525, a link that arrives at the ending point of the calculation and does not violate conditions 2–1 to 2–4 is picked up, and the end point of the link that is picked up is used at S526 as an end point of the avoided road on the side of the end point.

After the processing for obtaining the end point of the avoided road is executed as described above, the routine proceeds to S530 of FIG. 12. S530 sets the initial node cost at the end point of the avoided road on the side of the start point. Subsequent S540 to S600 are the same as S130 to S190 of FIG. 5 and are not described here again. After a node having a minimum cost is defined at S600, it is determined at S610 whether the cost of node at an end point of the avoided road on the end side has been defined. When it has not been defined (S610, NO), the routine returns back to S540. When the cost is defined (S610, YES), the routine proceeds to S620 to form a route.

As described above, the route is constituted by roads other than the particular roads. Therefore, other routes are interpolated at S630 and S640. That is, at S630, the section between the starting point of the calculation and the end point of the avoided road is interpolated and at S640, the section between the end point of the avoided road and the ending point of the calculation is interpolated.

(1) The above embodiments are based on having the time-priority mode, distance-priority mode and common road-priority mode and can be changed over and set when setting a route. However, the present invention may have only the common road-priority mode.

(2) In the above embodiment, the annexed road of a toll road is treated equally as the toll road, and the route cost is basically multiplied by 10 times in the common road-priority mode. This is because, the annexed road is a one-way road and is preferably treated as a toll road, not a common road. Generally, however, the annexed road has a short distance, and problems rarely occur though the route cost is not treated in the same manner as that of the toll road. In the common road-priority mode, therefore, the annexed road may be excluded from being multiplied by 10.

(3) In the above embodiments, the route is set using only data from a static data source. However, the route may be set by taking into consideration the data from a dynamic source, such as an external information center. In addition to that shown in FIG. 1, for example, communication equipment can be provided for communicating with an information sensor which is an external source of information, or an external data input/output device for receiving FM broadcast signals through a radio antenna that is not shown, or for receiving electromagnetic beacon signals and optical beacon signals from a fixed station for VICS service disposed near the road. This makes it possible to obtain data related to jamming in real time and, hence, to take the jamming degree on the road into consideration when setting the route. In this case, the formula for calculating the route cost is, for example, link length× coefficient of the width of road×coefficient of the kind of the road×degree of jamming.

While the above-described embodiments refer to examples of usage of the present invention, it is understood that the present invention may be applied to other usage, modifications and variations of the same, and is not limited to the disclosure provided herein. In the drawings:

What is claimed is:

1. A route-setting device for setting a route to a destination by calculating route evaluation values to nodes based on link data of links connecting the nodes and upon connection data of the links, and by connecting the links having a smallest total evaluation value from a start point to the destination, said route-setting device comprising:

a road-avoiding mode for setting a route to the destination that avoids roads of a particular type, wherein the road-avoiding mode uses a first route evaluation value for the particular road type to be avoided; and wherein the route evaluation value of the particular road type is automatically set to a second route evaluation value that is relatively smaller than the first route evaluation value.

2. A route-setting device according to claim 1, wherein an annexed road is assigned a route evaluation value for the particular road type when there is an annexed road for entering into the particular road type.

3. A route-setting device according to claim 1, wherein the second route evaluation value is set to a value corresponding to an evaluation value when a start point, a destination point or a passing point is on the particular road type and the route setting device operates in the road-avoiding mode.

4. A route-setting device according to claim 1, wherein when the second route evaluation value is set to a relatively small value, links to be treated are picked up in advance based upon the predetermined condition, and in really calculating the route, route evaluation values, that are set larger than those of the normal condition, are set to be relatively small values for the links that are picked up.

5. The route-setting device of claim 1 wherein the second route evaluation value is determined due to a predetermined condition, said predetermined condition being a situation when a start point, a destination point or a passing point is on the particular road type.

6. A route-setting device for setting a complete route to a destination by calculating route evaluation values to nodes based on link data of links connecting the nodes and upon connection data of the links, and by connecting the links having a smallest total evaluation value from a start point to the destination, said route-setting device comprising:

a road-avoiding mode for setting a first route to the destination that avoids roads of a particular type, wherein the first route is set by using a node pertaining to a road other than the particular road type that is close to the start point as a temporary calculation starting point or ending point, destination point or passing point when the start point, destination point or passing point is on the particular road type;

said road avoiding mode forming a second route from a true starting point of the calculation to a temporary starting point of the calculation or from a temporary ending point of the calculation to a true ending point of the calculation when the temporary starting point or ending point of the calculation is obtained; and the complete route to the destination is set by coupling the first route and the second route together.

7. A route-setting device according to claim 6, wherein the particular road type is a toll road.

8. A route setting device as claimed in claim 7, further comprising a guide means for guiding traveling along a route set by the route-setting device.

9. A method for setting a route to a destination with a route setting device, said method comprising the steps of:

calculating route evaluation values to nodes based on link data of links connecting the nodes and upon connection data of the links, and by connecting the links having a smallest total evaluation value from a start point to the destination;

setting a route to the destination that avoids a particular road type by using a first route evaluation value for the particular road type to be avoided; and setting the route evaluation value of the particular road type to a second route evaluation value that is relatively smaller than the first route evaluation value.

10. The method for setting a route to a destination with a route setting device according to claim 9, wherein the second route evaluation value is determined due to a predetermined condition, said predetermined condition being a situation when a start point, a destination point or a passing point is on the particular road type.

11. A method for arriving at a complete travel path to a destination with a travel path route-setting device comprising the steps of:

selecting a start point, intermediate points and a destination point along the complete travel path;

calculating evaluation values for travel roads connecting nodes between the start point and the destination point;

automatically assigning the evaluation values to roads of a particular road type by using a preselected-type road avoiding mode, the particular road type in the preselected-type road avoiding mode being user selected before leaving the start point, the evaluation values assigned to the roads of the particular road type with the preselected-type road avoiding mode being numerically larger than values assigned to the roads in a non-preselected-type road avoiding mode;

wherein, if the start point or the destination point is located on the preselected-type road, and the route-setting device receives instructions to search the route between the start point and the destination point under the preselected-type road avoiding mode, the evaluation values of the preselected-type road contained in the route will be smaller than a route evaluation value of a link, otherwise computed under the preselected-type road avoiding mode;

summing the evaluation values of the roads in the preselected-type road avoiding mode; and connecting the travel roads that have a minimum sum value of the evaluation values.

12. A method for arriving at a complete travel path according to claim 11, wherein an annexed road is assigned a route evaluation value for the particular road type when there is an annexed road for entering into the particular road type.

13. A method for arriving at a complete travel path according to claim 11, wherein the particular road type is a toll road.

14. A method for arriving at a complete travel path according to claim 11, wherein when the route-setting device allows the user to set a passing point between the start point and the destination point, and if the passing point is located on the preselected-type road, and a route via the passing point can be computed, the calculated evaluation value of each link of the preselected-type road contained in the route is completed.

15. A route-setting device for setting a route to a destination by calculating route evaluation values to nodes based on link data of links connecting the nodes and upon connection data of the links, and by connecting the links having a smallest total evaluation value from a start point to the destination, said route-setting device comprising:

a road-avoiding mode for setting a route to the destination that avoids roads of a particular type, wherein the road-avoiding mode uses a first route evaluation value for the particular road type to be avoided;

wherein the route t evaluation value of the particular road type is automatically set to a second route evaluation value that is relatively smaller than the first route evaluation value if under a predetermined condition, said predetermined condition being a start point, a destination point or a passing point is on the particular road type;

wherein when the second route evaluation value is set to a relatively small value, links to be utilized are picked up in advance based upon the predetermined condition, and in calculating the route, route evaluation values, that are set larger than those of the normal condition, are set to relatively smaller values for the links that are picked up;

wherein the route-setting device further comprises guide means for guiding traveling along a route set by the route-setting device; and wherein the particular is a toll road.

* * * * *